United States Patent
Bray et al.

(10) Patent No.: US 8,336,755 B2
(45) Date of Patent: Dec. 25, 2012

(54) FRICTION WELDING ENCLOSURE

(75) Inventors: Simon E. Bray, Derby (GB); Tony J. Sweeting, Derby (GB)

(73) Assignee: Rolls-Royce, PLC, London (GB)

( * ) Notice: Subject to any disclaimer, the term of this patent is extended or adjusted under 35 U.S.C. 154(b) by 68 days.

(21) Appl. No.: 12/451,416

(22) PCT Filed: May 23, 2008

(86) PCT No.: PCT/GB2008/001799
§ 371 (c)(1),
(2), (4) Date: Nov. 12, 2009

(87) PCT Pub. No.: WO2009/001027
PCT Pub. Date: Dec. 31, 2008

(65) Prior Publication Data
US 2010/0102106 A1  Apr. 29, 2010

(30) Foreign Application Priority Data
Jun. 23, 2007 (GB) .................................. 0712225.2

(51) Int. Cl.
*B23K 20/12* (2006.01)
(52) U.S. Cl. ....................................................... 228/2.1
(58) Field of Classification Search .... 228/112.1–114.5, 228/2.1, 2.3
See application file for complete search history.

(56) References Cited

U.S. PATENT DOCUMENTS

| | | | | |
|---|---|---|---|---|
| 3,093,104 A * | 6/1963 | Bukata | ......................... | 228/44.3 |
| 3,219,792 A * | 11/1965 | Pederson | .................. | 219/121.22 |
| 3,337,108 A * | 8/1967 | Taylor | ............................ | 228/2.3 |
| 3,438,561 A * | 4/1969 | Calton | ............................ | 228/13 |
| 3,853,258 A * | 12/1974 | Louw et al. | ..................... | 228/2.3 |
| 4,088,258 A * | 5/1978 | Regalbuto | ..................... | 228/193 |
| 4,820,900 A * | 4/1989 | Hohle et al. | ............ | 219/121.47 |
| 4,929,816 A | 5/1990 | Theurer et al. | | |
| 5,240,167 A * | 8/1993 | Ferte et al. | .................. | 228/114.5 |
| 6,637,642 B1 * | 10/2003 | Lingnau | .................... | 228/112.1 |
| 7,770,777 B2 * | 8/2010 | Miller | ........................ | 228/112.1 |

FOREIGN PATENT DOCUMENTS

| | | |
|---|---|---|
| CN | 1033694 A | 9/1989 |
| DE | 39 06 582 C1 | 4/1990 |

(Continued)

OTHER PUBLICATIONS

British Search Report conducted on Oct. 23, 2007 in the corresponding British Patent Application No. 0712225.2.

(Continued)

*Primary Examiner* — Kiley Stoner
*Assistant Examiner* — Carlos Gamino
(74) *Attorney, Agent, or Firm* — Oliff & Berridge, PLC

(57) ABSTRACT

A weld enclosure and welding apparatus including a weld enclosure. Also a method of welding. The apparatus has first and second opposed tooling faces adapted to receive and hold respective first and second weld elements. The weld enclosure comprises a housing that allows relative movement between the weld elements and a change in a physical dimension of at least one of the weld elements. The weld enclosure also comprises locating means for locating the housing relative to the welding apparatus and includes heating means.

15 Claims, 2 Drawing Sheets

FOREIGN PATENT DOCUMENTS

| | | |
|---|---|---|
| EP | 0 528 667 A1 | 2/1993 |
| FR | 2 760 985 A1 | 9/1998 |
| GB | 2 394 685 A | 5/2004 |
| JP | 03216285 A * | 8/1991 |
| JP | A-3-216285 | 9/1991 |
| JP | 05131280 A * | 5/1993 |
| JP | A-7-100669 | 4/1995 |
| WO | WO 00/25973 A1 | 5/2000 |

OTHER PUBLICATIONS

International Search Report issued on Sep. 9, 2008 in the corresponding International Application No. PCT/GB2008/001799.

Written Opinion of the International Searching Authority issued on Sep. 9, 2008 in the corresponding International Application No. PCT/GB2008/001799.

* cited by examiner

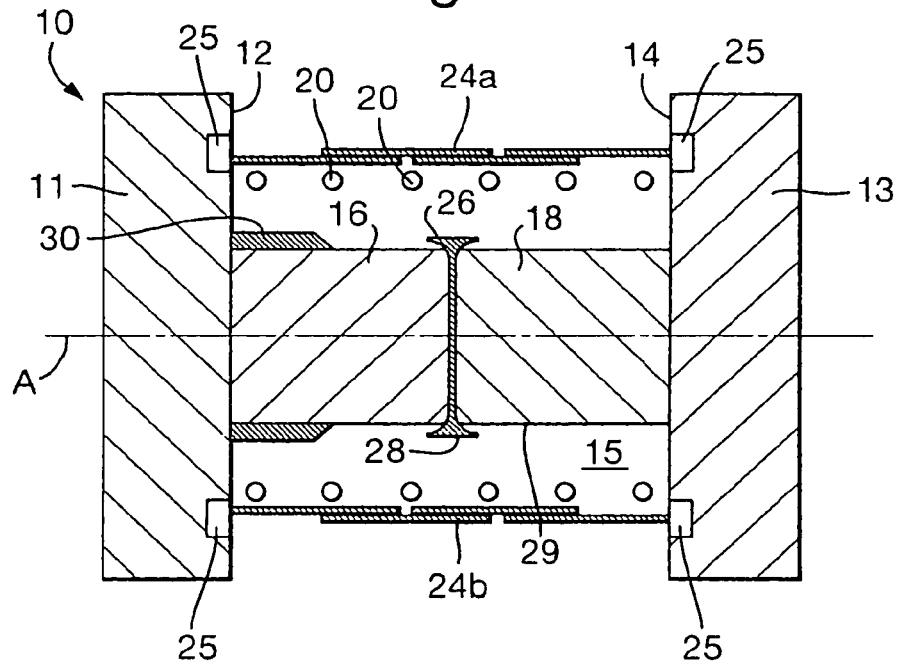
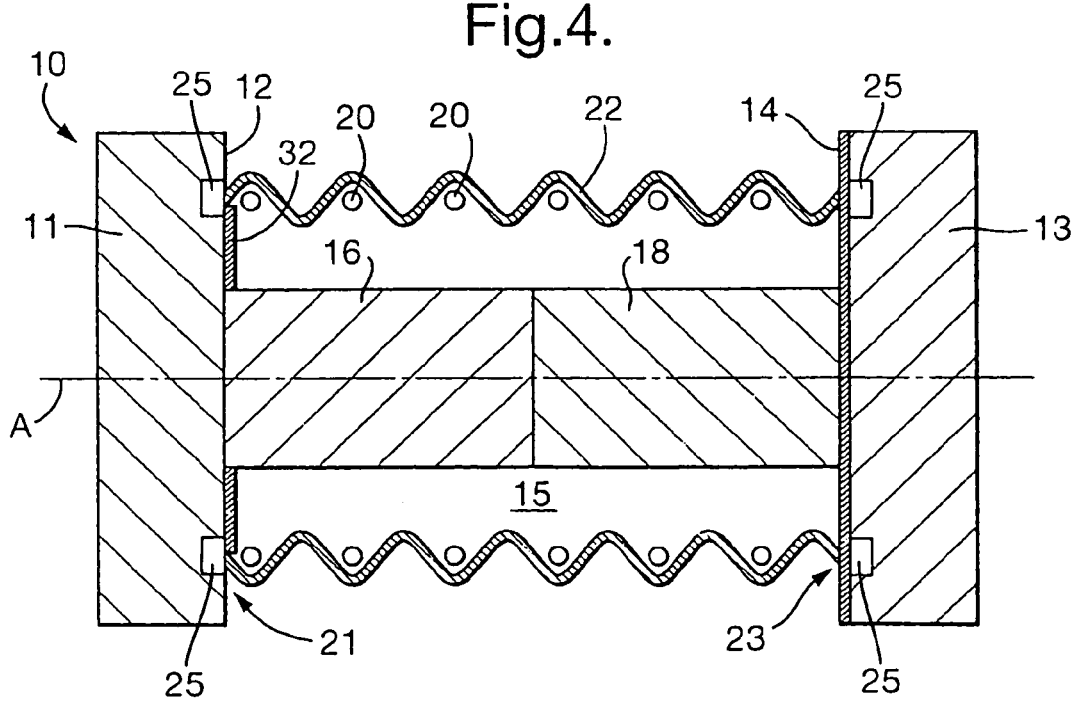

FRICTION WELDING ENCLOSURE

The present invention relates to improvements in welding apparatus and is particularly concerned with providing improved weld cooling rates.

In conventional friction welding apparatus two components to be welded together are held with their weldable surfaces facing. Heat is caused by frictional motion between the two components to cause one or both of the components to soften; this heating may be by linear friction, reciprocating angular motion, rotary motion (including inertial and orbital motion) or any other known method. The components continue to be forged together to enable the weld to form between the softened faces. The resulting welded component cools rapidly within the apparatus or during removal and transfer to a storage area or further apparatus. One disadvantage of this method is that the welded component cools very quickly due to its exposure to ambient conditions and the heat sink effects of the component, tooling and/or apparatus holding it. This cooling is uncontrollable and is at a rate in the order of 100° C. per second immediately following welding and may be up to 1000° C. per second for thin joints.

A further disadvantage of the rapid cooling provided by conventional friction welding apparatus lies in the formation of undesirable microstructures within the weld and surrounding material. For example, weld elements of Steel form Martensite in the weld region during rapid cooling which may be hard and brittle. These areas may lead to quench cracking during cooling and will, in any case, increase the brittleness of the finished component leading to decreased life. Furthermore rapid cooling at the rate detailed above does not allow any Bainite phase to form within the weld region. Inclusion of Bainite in the welded component reduces the risk of cracking at this location. Uncontrolled cooling leads to uncontrolled formation of Martensite and little or no Bainite formation, which means that the material properties of the component are not optimised. Other metals and their alloys, for example titanium and nickel, similarly form phases or phase distribution during rapid cooling.

A still further disadvantage of conventional friction welding apparatus is that the rapid cooling following a welding operation means that there is little or no residual heat for subsequent post-weld heat treatment (PWHT). Therefore, a large amount of energy is required to perform the welding and subsequent heat treatment operations since much of the energy is lost to the surroundings and the tooling or apparatus between welding operations.

Pre-heating of the components to be welded is beneficial to enable some control of the cooling rate and microstructure of the welded component and to reduce the energy required to perform the subsequent weld and/or to enable a larger surface area to be welded. One conventional method of pre-heating is to insert a hot probe between the surfaces of the components to be welded, prior to the welding steps described above. This locally heats the surfaces. The probe is withdrawn and the weld elements are rapidly pressed together to form the weld. One disadvantage of this heating method is that the weld element surfaces are exposed to ambient conditions and therefore rapidly cool even in the very short time whilst the probe is removed and the surfaces brought together. Hence the weld may be non-uniform and include areas of poor welding.

A further disadvantage of this pre-heating method is the difficulties experienced in welding dissimilar metals together. When the weld elements are heated by a hot probe as described a softer material will soften quicker than a harder material. Thus more material will be displaced or "upset" from the softer element and there will be an unequal reduction in length of the two elements.

Post-weld heat treatment (PWHT) may be applied to a welded component to optimise the microstructure and properties of the component and to relieve residual stresses. This involves transferring the component to a second apparatus before PWHT can occur. The transfer exposes the component to ambient conditions and the resultant rapid cooling discussed above. This means that any PWHT is of limited benefit as it attempts to reverse the effects of the rapid cooling.

The present invention seeks to provide welding apparatus that addresses the above mentioned problems.

Accordingly the present invention provides a weld enclosure for welding apparatus, the weld enclosure comprising a housing that accommodates relative movement between weld elements and a change in a physical dimension of at least one of the weld elements, location means for locating the housing relative to the welding apparatus, and heating means.

Preferably the housing is formed in a concertina shape to accommodate relative movement between the weld elements and a change in a physical dimension of at least one of the weld elements. Alternatively the housing may be formed in telescopic sections to accommodate relative movement between the weld elements and a change in a physical dimension of at least one of the weld elements.

Preferably the weld enclosure contains an inert gas, particularly argon.

Preferably the heating means comprises a plurality of axially spaced heating elements. More preferably the heating elements form at least one annular array around weld elements. Typically the heating elements are induction heaters. Alternatively the heating means is hot inert gas, preferably argon.

Preferably insulating means is provided within the weld enclosure adjacent at least one of first and second faces of the apparatus.

Preferably flash clipping means are provided. More preferably the flash clipping means are shears located concentrically with the weld elements and adapted to move parallel with the weld elements over at least some of the length of the weld enclosure. Typically the shears, when not in use, are located adjacent at least one of the first and second faces of the apparatus within the weld enclosure.

A second aspect of the present invention provides welding apparatus comprising tooling having first and second opposed faces axially spaced apart, the first and second faces being adapted to receive and operationally hold respective weld elements; the apparatus further comprising a weld enclosure including housing extending between first and second tooling faces and defining the extent of the weld enclosure, the weld enclosure including heating means and the housing accommodating relative movement between the weld elements and a change in a physical dimension of at least one of the weld elements.

Preferably the housing is formed in a concertina shape to accommodate relative movement between the weld elements and a change in a physical dimension of at least one of the weld elements. Alternatively the housing may be formed in telescopic sections to accommodate relative movement between the weld elements and a change in a physical dimension of at least one of the weld elements.

Preferably the weld enclosure contains an inert gas, particularly argon.

Preferably the heating means comprises a plurality of axially spaced heating elements. More preferably the heating elements form at least one annular array around the weld elements. Typically the heating elements are induction heaters. Alternatively the heating means is hot inert gas. Preferably the hot inert gas is argon.

Preferably insulating means is provided within the weld enclosure adjacent at least one of first and second faces of the tooling. Alternatively insulating means is provided adjacent the first and second faces of the tooling.

Preferably flash clipping means are provided. More preferably the flash clipping means are shears located concentrically with the weld elements and adapted to move parallel with the weld elements over at least some of the length of the weld enclosure. Typically the shears, when not in use, are located adjacent at least one of the first and second faces of the apparatus within the weld enclosure.

A third aspect of the present invention provides a method of welding first and second weld elements comprising the steps of:

(a) loading the weld elements into a welding apparatus;
(b) enclosing the weld elements within a weld enclosure comprising housing that accommodates relative movement between the weld elements and a change in a physical dimension of at least one of the weld elements;
(c) pre-heating the weld elements;
(d) welding the weld elements;
(e) controlling a thermal profile of a resultant welded component within the weld enclosure; and
(f) removing the welded component from the weld enclosure.

The welded component may be removed from the welding apparatus prior to or during step e. Alternatively the welded component may be removed from the welding apparatus during or after step f.

The present invention will be more fully described by way of example with reference to the accompanying drawings, in which:

FIG. 3 is a sectional view of the second embodiment of the friction welding apparatus following welding and including flash clipping means.

FIG. 4 is a sectional view of the first embodiment of the friction welding apparatus including two alternative insulation means.

Figure 1:
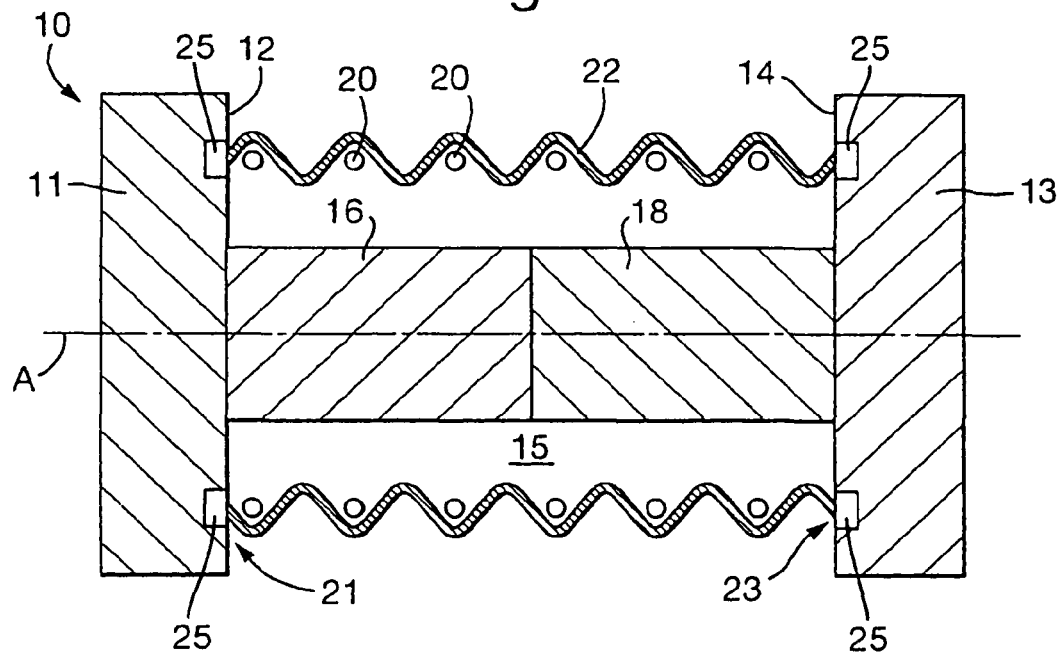
FIG. 1 is a sectional view of a first embodiment of the friction welding apparatus according to the present invention.

An exemplary embodiment of the present invention is shown in FIG. 1 in which the friction welding apparatus 10 comprises a first tooling component 11 having a first face 12 and an opposed, second tooling component 13 having a second face 14. First and second weld elements 16, 18 are received and held in respective first and second tooling faces 12, 14. The weld elements 16, 18 extend towards each other within a weld enclosure 15. Extending between the tooling faces 12, 14 and further defining the weld enclosure 15 is a housing 22. This is formed as an annular concertina that has variable length parallel to an axis A. Axis A is the axis of rotation for rotary friction welding and lies through the centre of the weld elements 16, 18 and perpendicular to their opposed faces.

One axial end 21 of the housing 22 is fixed to the first tooling face 12 such that it is located relative to the first weld element 16 and the first tooling face 12. Suitable location means (not shown), such as are well-known in the art, may be provided on the first axial end 21 of the housing 22 and/or on the apparatus 10 to effect this relative location. Typically the first tooling component 11 is a non-rotating part of the apparatus 10. The axially opposite, second end 23 of the housing 22 abuts the second tooling face 14. Locating means 25 may be provided to maintain the radial distance of the housing 22 from the second weld element 18 and also to act as bearings to allow the relative radial movement of the second tooling face 14 and the housing 22. Suitable sealing means (not shown) may be provided on one or both of the axial ends 21, 23 of the housing 22 and the tooling faces 12, 14 so that the weld enclosure 15 is substantially airtight or allows a controlled leakage of inert gas where this is used. An inert atmosphere may be used to reduce or substantially prevent oxidation and nitrogen inclusions in the welded component and therefore reduce the scrap rate during manufacture.

In a preferred embodiment, the friction welding apparatus 10 is adapted for rotary friction welding and therefore at least that part of the second tooling face 14 that is adapted to receive and hold the second weld element rotates around the axis A to impart the rotary motion required to cause softening or melting of at least one of the weld elements 16, 18. In this case the second axial end 23 of the housing 22 abuts the second tooling face 14 such that an airtight seal is provided, during the welding operation, between the rotating face 14 and the non-rotating housing 22 that does not impede the relative rotary motion. Thus, the second axial end 23 of the housing 22 may be separated from the second tooling face 14 to provide access to the weld enclosure 15. This may be required for a number of reasons including, but not limited to, loading the weld elements 16, 18 into the tooling components 11, 13; removing the welded component 29 after welding; and performing maintenance activities within the weld enclosure 15. Furthermore, both ends of the weld enclosure 15 may be detachable from the respective tooling faces 12, 14 so that the welded component 29 may be removed from the welding apparatus 10 and continue to be heated, or cooled at a controlled rate. This is particularly beneficial where a welded component 29' requires a long controlled cooling period as the welding apparatus 10 can be used for subsequent operations, with another weld enclosure 15 attached if required, whilst the controlled cooling is continuing.

Heating elements 20 are provided within the weld enclosure 15 defined by the tooling faces 12, 14 and the housing 22. In the example shown in FIG. 1 these heating elements 20 take the form of six annular arrays of point heat sources axially spaced through the weld enclosure 15. However, there may be a different number of annular arrays of point heat sources. In other embodiments the heating elements 20 may take the form of annular rings of heat generators such as induction heaters. Alternatively the heating elements may be hot inert gas sources for providing hot inert gas such as argon. Preferably the heating elements 20 are controlled individually or in discrete groups to provide differential heating at various axial locations within the weld enclosure 15. This is particularly advantageous if the weld elements 16, 18 are different materials, for example Alloy 720 and IN718. Thus the harder material (Alloy 720) can be preferentially heated to a higher temperature or for a longer period of time so that the relative upset caused to each element 16, 18 during the welding operation is equalised.

Figure 2:
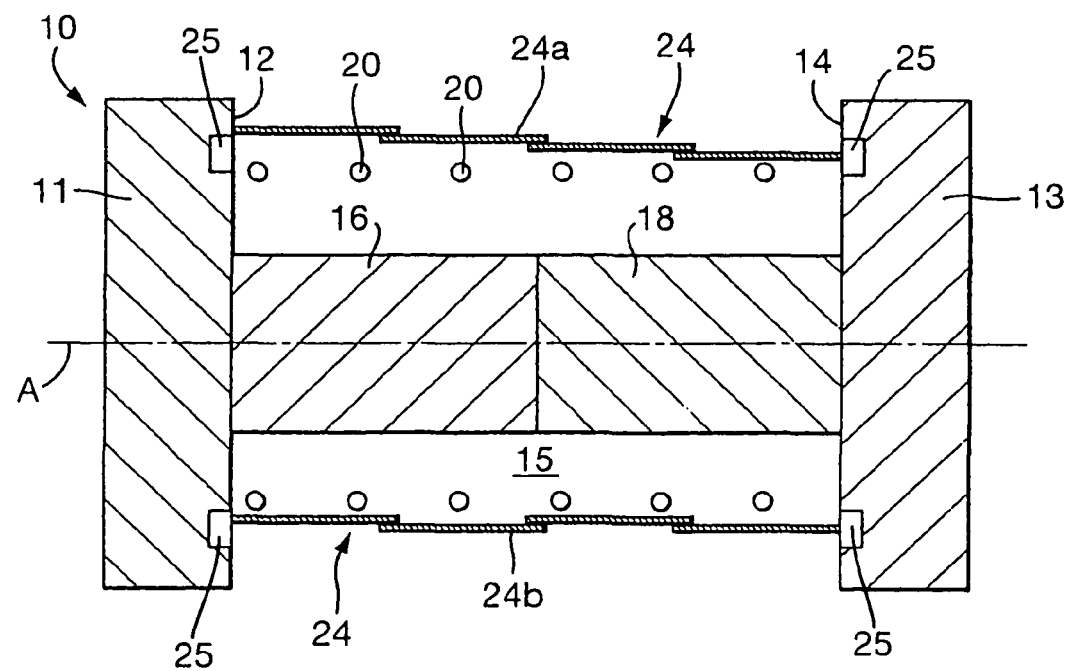
FIG. 2 is a sectional view of a second embodiment of the friction welding apparatus according to the present invention.

A second embodiment of the present invention is shown in FIG. 2 in which the friction welding apparatus 10, first and second tooling components 11, 13, first and second tooling faces 12, 14, weld enclosure 15, first and second weld elements 16, 18, heating elements 20, locating means 25 and axis A are as described for the first embodiment. Two arrangements of telescopic housing 24 are shown in FIG. 2. In the first arrangement, at the top of FIG. 2, the housing 24a comprises telescopic sections, consecutive sections having a reduced radius with respect to the previous section when viewed from left to right. In the second arrangement, at the bottom of FIG. 2, the housing 24b comprises telescopic sections, each with one of two radii and consecutive sections alternating between these radii. Insulating, sealing or connecting means (not shown) are provided between sections to maintain the required properties.

Conventional friction welding apparatus is designed to provide a small "stick out", the amount each weld element protrudes from the tooling face. This is so that a minimal amount of each weld element is exposed to the surrounding relatively cool air. The figures show a more pronounced "stick out" than is expected in practice to aid clarity only.

The present invention addresses this problem by the provision of the weld enclosure 15. The weld enclosure 15, and friction welding apparatus 10 incorporating the weld enclosure 15, of the present invention are able to accommodate large "stick out" of the weld elements 16, 18, which distances the tooling 11, 13 from the part of the welded component 29 that is heat-affected during the welding process. This benefits the tooling 11, 13 in terms of life. It also provides a more efficient welding process since the heating is contained within the weld enclosure 15 rather than being dissipated to the surrounding atmosphere and tooling 11, 13.

Furthermore, the nature and form of the housing 22, 24a, 24b partially defining the weld enclosure 15 provides additional advantages. Both the concertina housing 22 shown in FIG. 1 and the telescopic housing 24a, 24b shown in FIG. 2 are able to vary to accommodate a change in a physical dimension of the weld elements 16, 18, in this case the axial length. This enables the weld enclosure 15 to alter in axial length during the welding operation whilst preventing the weld elements 16, 18 from being exposed to the cooling effects of the ambient air exterior to the weld enclosure 15. Hence larger diameter elements 16, 18 can be welded together since the weld enclosure 15 is able to accommodate the significant reduction in axial length of the welded component 29 compared to the weld elements 16, 18 caused by the material displacement to one or, more preferably, both weld elements 16, 18. The weld enclosure 15 is sufficiently robust and is located sufficiently radially distant from the weld elements 16, 18, that neither welding sparks nor flash impingement causes damage in either its uncompressed or compressed states. This also means that the weld enclosure 15 is able to accommodate relative movement between the weld elements 16, 18, for example approximately perpendicular to the axis A.

FIG. 3 shows the second embodiment of the weld enclosure 15 following welding of weld elements 16, 18, by way of example; the first embodiment is equally conducive to the flash clipping means herein described. The telescopic housing sections 24b are well overlapped to accommodate the reduction in length caused by the welding operation. The weld 26 produced between the first and second weld elements 16, 18 is surrounded by flash, or upset, 28 which is the material displaced from the weld elements 16, 18 during the steps of heating the elements 16, 18, by causing frictional motion between them, and pressing them together to form the weld 26. Flash clipping means 30, being concentric shears in this example, are provided adjacent to the first tooling face 12 of the apparatus 10. Once the weld 26 has been formed, but prior to significant cooling, the shears 30 are moved along the welded component 29 at least far enough to cut away the flash 28 from the weld 26. Since the welded element is hot and malleable, due to the heating and welding operations, the flash 28 is cut away with little resistance or stress to the weld 26, the surrounding areas of the welded component 29 or the shears 30. Following the flash clipping operation the shears 30 are returned to the rest position adjacent to the first tooling face 12.

In an alternative embodiment two shears 30 may be provided, one adjacent to each tooling face 12, 14 of the apparatus 10. In operation, these could meet at the weld 26 to effect cutting away of the flash 28. Alternatively, first one of the shears 30 could move across at least some of the length of the welded component 29 to cut away the flash 28 and return to its resting place. Then the second of the shears 30 could move across at least some of the length of the welded component 29 to cut away any remaining flash 28 or to clean the area around the weld 26. In this alternative arrangement the shears 30 could be arranged at different radii from the axis A, compared to the radius of the welded component 29, to provide a rough cut with the first of the shears 30 and a finishing cut with the second of the shears 30.

FIG. 4 shows two embodiments of insulation for the tooling 11, 13 of the apparatus 10, using the first embodiment of the housing 22 by way of example. The telescopic sections 24a, 24b are equally conducive to the insulation means herein described. A first insulation arrangement 32 is shown on the left of FIG. 4. The insulation 32 is located radially inwardly of the weld enclosure 15 and adjacent to the first tooling face 12 of the apparatus 10. An aperture is provided within the insulation 32 to allow the weld element 16 to be received in the first tooling face 12. The insulation 32 may be any suitable insulating means known in the art including, but not limited to, glass fibre, heat reflective foils, ceramics and asbestos.

A second insulation arrangement 34 is shown on the right of FIG. 4. The insulation 34 forms the second tooling face 14 of the apparatus 10. The insulation 34 may be formed integrally with the tooling face 14 as a thin layer or may form substantially the whole of the tooling component 13. Alternatively it may be a layer of insulating material attached to the tooling face 14 by bonding, mechanical means such as dovetail joints, or by being sprayed onto the surface of tooling face 14. The best form of insulation and method of applying it will be dictated by the welding operations to take place.

Provision of insulation 32, 34 improves the efficiency of the friction welding apparatus 10 by reducing the heat lost between welding and heat treatment operations. Thus, the first welding operation in a period requires sufficient energy to heat the weld elements 16, 18 from ambient. However, the insulation 32, 34 ensures that heat treatment operations take place in a weld enclosure 15 having residual heat and so comparatively less heat is required.

Hence the weld enclosure 15, and the friction welding apparatus 10 including the weld enclosure 15, hereinbefore described provides for welding with a reduced energy requirement or welding operations requiring a greater energy budget than previously possible.

The weld enclosure 15 further provides for PWHT and controlled cooling of the welded component 29. Since the housing, in any suitable configuration, isolates the welded component 29 from the surrounding ambient air, a slower cooling rate is achievable than in conventional welding apparatus arrangements. This is typically an order of magnitude slower than without the weld enclosure 15. Preferably the housing is formed of an insulating material so that the cooling rate is further controlled. Furthermore, some or all of the heating elements 20 can be employed after the welding operation is complete to assist in controlling the cooling rate. This has the additional advantage that differential cooling may be applied along the axial length of the welded component 29 and thereby ensures that much greater control of the material properties of the welded component 29 is possible than in previous welding apparatus arrangements. The heating elements 20 may be linked to a feedback control loop comprising sensors within the weld enclosure 15, or at any other suitable location, to dynamically alter the heating provided. This has the further benefit that post-weld heat treatment can be directed to the weld region and not applied globally to the whole welded component 29. This may be a more economic approach and may provide better control of the microstructure and properties of the welded component 29. The heating elements 20 provide sufficient flexibility that welded components 29 with different material properties may be created by welding similar weld elements 16, 18 in the same weld enclosure 15, located within the same apparatus 10, and employing a different heating strategy during the pre-heat, welding and post-weld phases.

Modifications within the scope of the invention will be apparent to the skilled reader. For example, not only bars may be welded together but also tubes and more complex geometries, such as blades to discs for gas turbine engines. The heating elements 20 in the first embodiment are shown at the furthest possible radial extent of the weld enclosure 15. However, they may equally, and in some circumstances preferably, be located radially closer to the weld elements 16, 18. There may be more or fewer annular arrays or rings; these need not be symmetrically located. Alternatively the heating elements 20 may comprise a spiral or helical form around the weld elements 16, 18 and within the weld enclosure 15. Heating elements 20 may additionally or alternatively be provided radially outwardly of the weld enclosure 15.

Although the housing has been shown and described comprising housing in a concertina 22 or telescopic 24a, 24b arrangement the skilled reader will understand that other shaped housing may be substituted to derive the advantages of the present invention. For example, the housing may comprise resilient material that is stretched between the tooling faces 12, 14 to enclose the weld elements 16, 18. Since the welded component 29 is shorter than the combined length of the weld elements 16, 18, the resilient material relaxes towards its natural length to accommodate the reduction in axial length. Alternatively, the housing may comprise any suitable material or form exhibiting the desired properties.

Although the weld enclosure 15 has been described in conjunction with suitable rotary friction welding apparatus 10, it will be apparent to the skilled reader that the weld enclosure 15 may be fitted to any welding apparatus, whether during original manufacture or by subsequent adaptation, to derive the advantages of the present invention. The welding apparatus may comprise apparatus suitable for friction welding by linear motion, reciprocating angular motion, inertial motion or any other form of welding known in the art such as flash welding or upset welding. The welding enclosure 15 accommodates relative movement between the weld elements 16, 18 caused by any of these welding methods and also accommodates the change in a physical dimension of at least one of the weld elements 16, 18, usually a reduction in a direction substantially perpendicular to the weld interface between the weld elements 16, 18.

The invention claimed is:

1. A weld enclosure for a friction welding apparatus, the weld enclosure comprising:
    a housing that accommodates relative movement between weld elements by changing physical dimensions and a change in a physical dimension of at least one of the weld elements in a direction perpendicular to a plane of the opposed faces of the weld elements,
    a location device that locates the housing relative to the friction welding apparatus, and
    a heating arrangement comprising a plurality of axially spaced heating elements.

2. A weld enclosure as claimed in claim 1 wherein the housing is formed in a concertina shape to accommodate relative movement between the weld elements and a change in a physical dimension of at least one of the weld elements.

3. A weld enclosure as claimed in claim 1 wherein the housing is formed in telescopic sections to accommodate relative movement between the weld elements and a change in a physical dimension of at least one of the weld elements.

4. A weld enclosure as claimed in claim 1 wherein the weld enclosure contains an inert gas.

5. A weld enclosure as claimed in claim 4 wherein the inert gas is argon.

6. A weld enclosure as claimed in claim 1 wherein the heating elements form at least one annular array around the weld elements.

7. A weld enclosure as claimed in claim 1 wherein the heating elements are induction heaters.

8. A weld enclosure as claimed in claim 1 wherein the heating arrangement is hot inert gas.

9. A weld enclosure as claimed in claim 8 wherein the hot inert gas is argon.

10. A weld enclosure as claimed in claim 1 wherein insulation is provided within the weld enclosure adjacent at least one of first and second faces of the apparatus.

11. A weld enclosure as claimed in claim 1 wherein flash clipping means are provided.

12. A weld enclosure as claimed in claim 11 wherein the flash clipping means are shears located concentrically with the weld elements and adapted to move parallel with the weld elements over at least some of the length of the weld enclosure.

13. A weld enclosure as claimed in claim 12 wherein the shears, when not in use, are located adjacent at least one of first and second faces of the apparatus and within the weld enclosure.

14. The friction welding apparatus comprising tooling having first and second opposed faces axially spaced apart, the first and second faces being adapted to receive and operationally hold respective weld elements; the apparatus further comprising a weld enclosure capable of changing physical dimensions as claimed in claim 1.

15. The friction welding apparatus as claimed in claim 14 wherein insulation is provided within the weld enclosure adjacent at least one of the first and second faces of the tooling.

* * * * *